US008423961B2

(12) United States Patent
Byers et al.

(10) Patent No.: US 8,423,961 B2
(45) Date of Patent: Apr. 16, 2013

(54) SIMULATING OPERATIONS THROUGH OUT-OF-PROCESS EXECUTION

(75) Inventors: Richard M. Byers, Bellevue, WA (US); Jonathon Michael Stall, Bothell, WA (US); Gregg B. Miskelly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1349 days.

(21) Appl. No.: 12/134,908

(22) Filed: Jun. 6, 2008

(65) Prior Publication Data

US 2009/0307528 A1 Dec. 10, 2009

(51) Int. Cl.
*G06F 9/44* (2006.01)

(52) U.S. Cl.
USPC .......................................... 717/124

(58) Field of Classification Search .................. None
See application file for complete search history.

(56) References Cited

U.S. PATENT DOCUMENTS

| | | | |
|---|---|---|---|
| 6,401,109 B1 * | 6/2002 | Heiney et al. ...................... | 718/1 |
| 6,598,181 B1 * | 7/2003 | Pennell ...................... | 714/38.14 |
| 6,766,350 B1 | 7/2004 | Moreau | |
| 6,842,786 B1 | 1/2005 | Webb | |
| 6,980,997 B1 | 12/2005 | Peschel-Gallee et al. | |
| 7,150,006 B2 | 12/2006 | Bliss et al. | |
| 7,219,329 B2 | 5/2007 | Meijer et al. | |
| 7,496,897 B1 * | 2/2009 | Dibble et al. .................. | 717/127 |
| 2003/0014473 A1 * | 1/2003 | Ohsawa et al. ............... | 709/107 |
| 2004/0054992 A1 * | 3/2004 | Nair et al. ...................... | 717/138 |
| 2005/0193264 A1 | 9/2005 | Khan et al. | |
| 2005/0246677 A1 | 11/2005 | Mountain et al. | |
| 2006/0004562 A1 | 1/2006 | Mountain et al. | |
| 2006/0101412 A1 | 5/2006 | Lev et al. | |
| 2006/0225033 A1 | 10/2006 | Ye et al. | |
| 2007/0220527 A1 | 9/2007 | Tolgu et al. | |
| 2008/0244578 A1 * | 10/2008 | Yoav et al. ...................... | 718/100 |

OTHER PUBLICATIONS

Zhang, Yi, et al., "CLR Inside Out Marshaling between Managed and UnmanagedCode", 2008 Microsoft Corporation, 8 pages.
Strein, Dennis, et al., "Design and Implementation of a high-level multi-language .NET Debugger", .NET Technologies 2005 conference proceedings, 8 pages.

* cited by examiner

*Primary Examiner* — Wei Zhen
*Assistant Examiner* — Adam R Banes
(74) *Attorney, Agent, or Firm* — Workman Nydegger (57) ABSTRACT

The present invention extends to methods, systems, and computer program products for simulating operations through out-of-process execution. When a diagnostic operation is to be performed for a target execution context, a separate execution context is created based on the same executable code used to create the target execution context. An execution boundary separates the target execution context and the separate execution context such that execution in the separate execution context does not influence the behavior of the target execution context. State data from the target execution context is marshaled and transferred to the separate execution context. The separate execution context reconstitutes the state data and uses the state data to perform the diagnostic operation. Accordingly, performance of the diagnostic operation is simulated in the separate execution context without influencing the behavior of the target execution context.

20 Claims, 3 Drawing Sheets

SIMULATING OPERATIONS THROUGH OUT-OF-PROCESS EXECUTION

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Computer system tasks are typically implemented in computer code of software programs that run on a computer system to perform the various designed tasks. Depending on the software program, computer code for performing computerized tasks can vary from relatively simply to relatively complex.

In some environments computer code is developed to run directly on a target machines in "native" format. This format for code storage is relatively popular. However, another model for code execution manages the code rather than allowing direct execution. Typically such code is stored and transported in an "intermediate language" form that is not itself executable.

Intermediate language instructions are a refinement of higher level code (e.g., C#, C++, Visual Basic, etc.), even though the intermediate instructions have not been compiled to native code yet. However, intermediate language instructions can be compiled into native code to suit each target machine just before or even during runtime. For example, intermediate language code may be distributed in the same form to both an X86 and an IA64 machine and can run on both machines after further compilation (e.g., using appropriate Just-In-Time ("JIT") compilers). Accordingly, use of an intermediate language increases the ease of distribution and compatibility of software programs.

As such, a developer or group of developers writes the source code for a program or executable. Once the source code has been completed, it is compiled into the intermediate representation. The intermediate code can then be distributed and further compiled as described above.

Typically, the compilation and execution of intermediate language instructions are controlled or managed on the target machine by a runtime environment. That is, another module or entity other than the code itself or the operating system of the target machine controls and/or manages execution at the target machine. Accordingly, this type of code is generally referred to as managed code, whereas code that runs directly in native format without management is generally referred to as unmanaged code. Examples of managed code include code produced to operate with the Common Language Runtime (CLR), a Java virtual machine, etc.

There are a number of benefits in addition to ease of distribution and compatibility associated with the use of managed code. For example, a runtime environment can provide memory management services such as garbage collection, and may also provide security functions, reflection, etc.

With respect to all types of code, managed and unmanaged alike, it is desirable that the code be as free of errors as possible to assure a high quality product for the end user. However, it can take some amount of work by a software developer to get even relatively simple software programs to work as the software developer depends. During the development cycle computer code can run but not produce intended results, can run with errors (e.g., crashes, etc), or may simply not run at all. Thus, within the development cycle a software developer can take diagnostic measures, such as, for example, debugging and testing computer code, to identify and correct design and execution problems with a software program.

At least one debugging mechanism for debugging managed code includes a debugger module in the runtime environment. Thus, the debugger runs when the computer code for the software program runs, both being run within the run-time environment (e.g., in the same process). During execution the debugger module accesses information regarding the state of the computer code for the software program from the memory used by the computer code and runtime environment.

Unfortunately, relying on a debugger module in the runtime environment for a software program has a number of drawbacks. For example, execution of the debugger can influence execution of the software program. Thus, during debugging of the software program, the software program's behavior may not accurately reflect its behavior when the software is not being debugged. In some cases, execution of the debugger may even cause otherwise undesired program behavior to be corrected such that it is even more difficult to determine an underlying cause of the undesired behavior.

Additionally, using embedded debugging techniques execution of the debugger and the software program are linked (since the debugger and software program are within the same computer code or process). Thus, if execution of the software program is stopped by stopping the process, execution of the debugger would also be stopped. Stopping the debugger when the software program is stopped is highly undesirable since it is typically necessary to check the state of the computer code while it is halted, or to check the state of the computer code based on a dump file after a crash (and a dump file always represents a "stopped" program).

So, in many debugging systems it is desirable to provide as much of the debugging functionality as possible without executing any debugging code in-process with the software program. One area where this goal is particularly challenging is for the "function evaluation" (funcEval) feature of many debuggers. This feature allows users (or the debugging tool itself) to execute operations in the target program without changing their program code or restarting the debugging session. Typically FuncEval is implemented by hijacking a thread in the target process and setting it up to execute the desired code.

However, there are several limitations to hijacking including: the necessity of having a running target process (e.g., won't work with a process dump) and potential to undesirably modify the target process state. Further, arbitrary access to target process data introduces a risk of violating program invariants and safety by injecting calls at points that aren't anticipated by the program. For example, target process data access can cause deadlocks and data structure corruption. Additionally, there is often difficulty creating/finding a thread which can safely make the function call. Thus, funcEval can be limited to specific safe points within a target process.

One option for performing debugger operations (including some FuncEval scenarios) from out-of-process is to use special-purpose code designed to perform the same algorithms as the in-process code but using out-of-process memory access. The use of special-purpose debugging code is common for reading simple operating system data structures which make little/no use of pointers (e.g., intermediate language file headers). However, when using special-purposed debugging code the use of real pointers must be avoided. Alternately, there must be duplicate code for in and out-of-process execution. However, maintaining either option increases the relative complexity and cost of the in-process code. That later option can be especially difficult to maintain when data structures change over time.

BRIEF SUMMARY

The present invention extends to methods, systems, and computer program products for simulating operations through out-of-process execution. In some embodiments, data is marshaled for performing a diagnostic operation (e.g., a debugging operation, such as, a function evaluation) for a target execution context (e.g., a managed process). A computer system receives an indication that a diagnostic operation is to be performed for part of a target execution context within another separate execution context (e.g., a separate managed process). The other separate execution context is separated by an execution boundary (e.g., a process boundary) such that execution within the other separate execution context does not influence execution outside of the other separate execution context. The other separate execution context is to be created from an instrumented version of the module used to create the target execution context. That is, for example, created automatically by transforming the software code, as opposed to being written and maintained specially for out-of-process execution.

The computer system non-invasively obtains a portion of state data related to performing the diagnostic operation for the part of the target execution context. Non-invasively obtaining the state data includes accessing state data memory locations and/or registers that the target execution context is using to store state data during execution. The state data is accessed (e.g., using debugging APIs) without altering any state in the target execution context.

The computer system marshals any obtained state data into a format (e.g., an on-the-wire format) for delivery to the other separate execution context so that the other separate execution context can perform the diagnostic operation based on the obtained state data. Accordingly, the other separate execution context can simulate performance of the diagnostic operation within the target execution context without influencing subsequent execution within the target execution context.

In other embodiments, a diagnostic operation (e.g., a debugging operation) is performed for a target execution context. A computer system creates another separate execution context from an instrumented version of the module (e.g., instrumented intermediate language code) used to create the target execution process. Thus, part of the other separate execution context is correspondingly representative of part of the target process. The computer system transfers non-invasively obtained state data of the target execution (e.g., in the on-the-wire format) context to the other separate execution context.

The computer system reconstitutes the state data into a format compatible with the target execution context. The computer system uses the reconstituted state data to perform the diagnostic operation for the part of the other separate execution context to simulate performance of the diagnostic operation on the correspondingly representative part of target execution context. Accordingly, the diagnostic operation is performed for the target execution context without influencing the execution within the target execution context.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for simulating operations through out-of-process execution. In some embodiments, data is marshaled for performing a diagnostic operation (e.g., a debugging operation, such as, a function evaluation) for a target execution context (e.g., a managed process). A computer system receives an indication that a diagnostic operation is to be performed for part of a target execution context within another separate execution context (e.g., a separate managed process). The other separate execution context is separated by an execution boundary (e.g., a process boundary) such that execution within the other separate execution context does not influence execution outside of the other separate execution context. The other separate execution context is to be created from an instrumented version of the module used to create the target execution context. That is, for example, created automatically by transforming the software code, as opposed to being written and maintained specially for out-of-process execution.

The computer system non-invasively obtains a portion of state data related to performing the diagnostic operation for the part of the target execution context. Non-invasively obtaining the state data includes accessing state data from memory locations and/or registers that the target execution context is using to store state data during execution. The state data is accessed (e.g., using debugging APIs) without altering any state in the target execution context.

The computer system marshals any obtained state data into a format (e.g., an on-the-wire format) for delivery to the other separate execution context so that the other separate execution context can perform the diagnostic operation based on the obtained state data. Accordingly, the other separate execution context can simulate performance of the diagnostic operation within the target execution context without influencing subsequent execution within the target execution context.

In other embodiments, a diagnostic operation (e.g., a debugging operation) is performed for a target execution context. A computer system creates another separate execution context from an instrumented version of the module (e.g., instrumented intermediate language code) used to create the target execution process. Thus, part of the other separate execution context is correspondingly representative of part of the target process. The computer system transfers non-invasively obtained state data of the target execution (e.g., in the on-the-wire format) context to the other separate execution context.

The computer system reconstitutes the state data into a format compatible with the target execution context. The computer system uses the reconstituted state data to perform the diagnostic operation for the part of the other separate execution context to simulate performance of the diagnostic operation on the correspondingly representative part of target execution context. Accordingly, the diagnostic operation is performed for the target execution context without influencing the execution within the target execution context.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Within this description and following claims, a "diagnostic operation" is defined as any operation responsive to information gathered from and/or related to the execution of instructions within computer architecture. Diagnostic operations include debugging operations, testing operations, profiling operations, benchmarking operations, checkpointing operations, roll back operations, comparison operations, etc.

Within this description and following claims, an "execution context" is defined as data relevant to the execution of executable instructions, such as, for example, of a managed process. Execution context can include security context, call context, and synchronization context.

Figure 1:
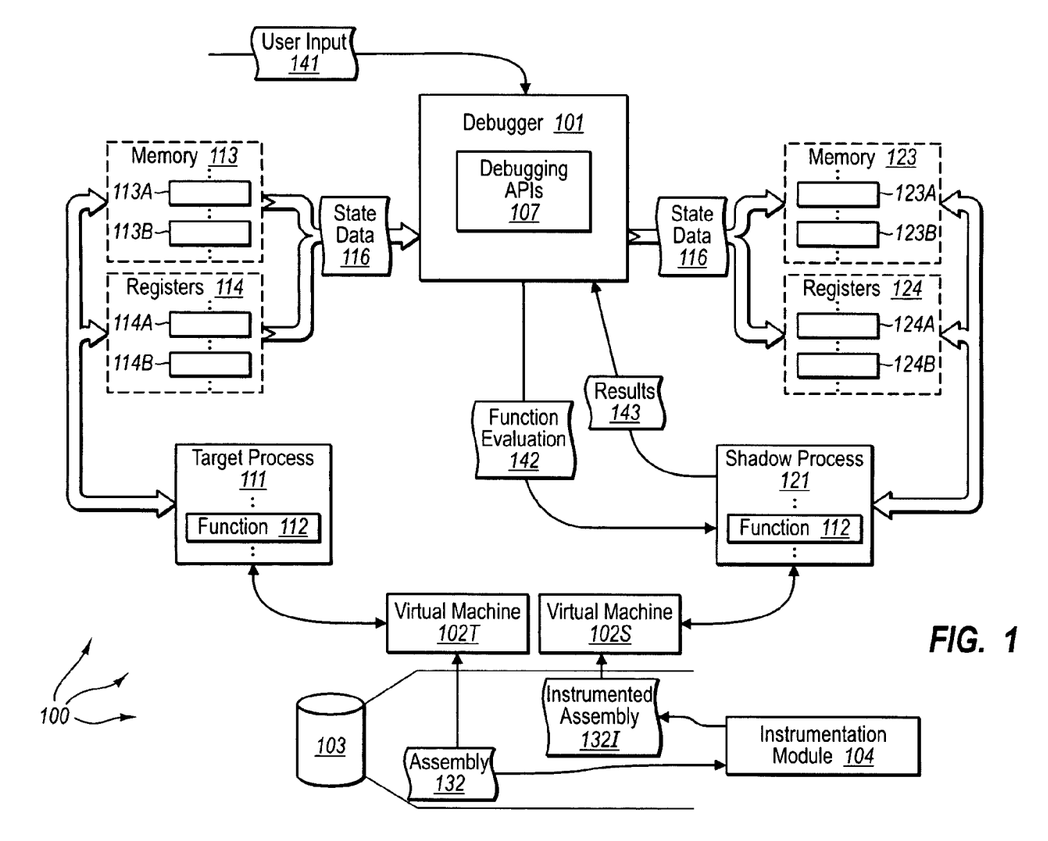
FIG. 1 illustrates an example computer architecture that facilitates simulating operations through out-of-process execution.

FIG. 1 illustrates an example computer architecture 100 that facilitates simulating operations through out-of-process execution. Referring to FIG. 1, computer architecture 100 includes debugger 101, virtual machine 102T, virtual machine 102S, and instrumentation module 104. Each of the depicted components can be connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, a virtual machine is a software implementation that models a computer system and executes programs like a computer system, such as, for example, a Common Language Runtime ("CLR") or Java Runtime Environment (also known as a Java Virtual Machine ("JVM"). A virtual machine can includes a Just-In-Time ("JIT") compiler that loads and compiles partially compiled instructions, such as, for example, intermediate language ("IL") instructions or Java bytecode, into native instructions of computer architecture 100. A virtual machine manages and controls the execution of the native instructions within computer architecture 100.

Partially compiled instructions can be included in assemblies that are stored at storage 103. In response to automated or user commands, a virtual machine can load a module, compile instructions in the module into native instructions of computer architecture 100, and manage execution of the native code. For example, virtual machine 102T can load and compile assembly 132 (or some other module)_into target process 111. Virtual machine 102T can then manage and control the execution of target process 111. Similarly, virtual machine 102S can load and compile instrumented assembly 132I (or some other corresponding instrumented module) into shadow process 121. Virtual machine 102S can then manage and control the execution of shadow process 121. Thus, computer architecture 100 represents a managed code environment where the same instructions can be executed under the management of different, virtual machines that have essentially the same implementation. Accordingly, the same module can be loaded in two different execution states.

Debugger 101 is generally configured to debug managed code that is executed in computer architecture 100. Debugger 101 can implement various different debugging operations to debug managed code. For example, debugger 101 can be configured to show the position in executed code when executed code crashes. Debugger 101 can be configured to show executable code in disassembly. Debugger 101 can be configured to execute executable instructions step-by-step (single-stepping) and stop (break) executable instructions at an event by setting a breakpoint. Breakpoints can be used to pause executable instructions for examination. Debugger 101 can also be configured to track the values of variables within executed instructions.

Further, debugger 101 can be configured to call an arbitrary function when stopped at a breakpoint. This is referred to as function evaluation, or "funcEval".

Debugger 101 also includes debugging APIs 107. Debugging APIs 107 are configured to marshal managed data out of a target process without running code in the target process. Debugging APIs 107 are also configured to store marshaled data in an intermediate format that preserves managed state.

Instrumentation module 104 is configured to instrument modules for use in performing out-of-process diagnostic operations. Instrumentation module 104 can receive a module, such as, for example, assembly 132. Instrumentation module 104 can instrument the module with new opcodes. Instrumentation module 104 can then output an instrumented version of the module, such as, for example, instrumented assembly 132I. New instructions in an instrumented module can indicate state data needed to perform a diagnostic operation, can represent code modifications for correct code execution, and can be used to erect "safety barrier" for safe code execution. For example, instrumented code can prevent accessing data that could not be safely marshaled to the isolated execution environment, such as certain raw pointer values in the original process.

Upon executing executable instructions, a virtual machine can allocate various system resources to the executable instructions. For example, virtual machine 102T can execute assembly 132 to create target process 111. Virtual machine 102T can allocate memory 113 and registers 114 to target process 111. Target process 111 can use memory locations, such as, for example, memory locations 113A, and 113B, and registers, such as, for example, registers 114A and 114B, to store data during execution. For example, one or more of memory locations 113A, 113B, etc. and registers 114A, 114B, etc, can store data relevant to the execution of function 112.

Similarly, virtual machine 102S can execute assembly 132I to create target shadow process 121. Virtual machine 102S can allocate memory 123 and registers 124 to shadow process 121. Shadow process 121 can use memory locations, such as, for example, memory locations 123A, and 123B, and registers, such as, for example, registers 124A and 124B, to store data during execution. For example, one or more of memory locations 123A, 123B, etc. and registers 124A, 124B, etc, can store data relevant to the execution of function 112.

From time to time, a user of computer architecture 101 may desire to perform diagnostic operations on portions of a target execution context. Any number of different types of diagnostic modules, such as, for example, testing modules, profiling modules, checkpointing modules, benchmarking modules, comparison modules, and roll back modules, can be used to perform diagnostic operations on a target execution context. Thus, the user can enter diagnostic input at any of these or types of diagnostic modules to indicate such a desire. Thus, a user can submit debugging input at debugger 101 to indicate a desire to debug target process 111. For example, a user can indicate a desire to evaluate a function (e.g., function 112) of target process 111.

In response, a diagnostic module can instruct a virtual machine to create a shadow process from an instrumented version of the assembly used to create target process 111. For example, debugger 101 can instruct virtual machine 102S to create shadow process 121 from instrumented assembly 132I. Virtual machine 102S can allocate memory 123 and registers 124 to shadow process 121. Shadow process 121 can use memory locations, such as, for example, memory locations 123A, and 123B, and registers, such as, for example, registers 124A and 124B, to store data during execution.

Since the shadow process is created from an instrumented version of the assembly used to create the target process, the functionality of the shadow process is essentially the same as the target process. Thus, shadow process 121 can include the same arrangement of op codes as target process 111. Accordingly, during execution, target process 111 and shadow process 121 exhibit virtually the same behavior (when provided with equivalent state data).

An execution boundary, such as, for example, a process boundary can separate shadow process 121 and target process 111. Thus, execution with in shadow process 121 does not influence execution within target process 111.

In response to diagnostic input, a diagnostic module can use APIs to non-invasively access and marshal state data from memory 113 and/or registers 114. For example, debugger 101 can utilize debugging APIs 107 to non-invasively access and marshal state data from memory 113 and/or registers 114. Debugging APIs 107 as well as other diagnostic APIs can store the marshaled state data in an intermediate format that preserves managed state. The diagnostic module can then forward the marshaled state data (in the intermediate format) to the shadow process. For example, debugger 101 can forward the marshaled state data (in the intermediate format) to a shadow process configured to simulate target process 111. The shadow process can then reconstitute in the state data into a format compatible with the shadow process. For example, shadow process 121 can reconstitute state data into memory 123 and/or registers 124 in a compatible format.

The shadow process can then perform the diagnostic operation using the reconstituted state data to simulate the behavior the diagnostic operation would have had if performed in the target process. Thus, a shadow process can perform any of a debugging operation, testing operation, profiling operation, benchmarking operation, checkpointing operation, roll back operation, comparison operations, etc, using reconstituted state data simulate the behavior the operation would have had if performed in the target process. For example, shadow process 121 can evaluate a function from target process 111 (e.g., function 112) using the reconstituted state data to simulate the behavior the function would have had if evaluated in target process 111.

Embodiments of the invention can marshal state data using various different mechanisms. In some embodiments, state data is marshaled on an as-needed basis based the diagnostic operation being performed. State data can be marshaled as-needed in response to code attributes and/or annotations detected in a shadow process. For example, when a function evaluation is requested, code attributes and/or annotations on the function in the shadow process can indicate the appropriate state data for evaluating the function. Automatically and in response to detecting code attributes and/or annotations in the shadow process, debugger 101 can instruct debugger APIs 107 to marshal appropriate state data from target process 111.

In other embodiments, upon receiving diagnostic input, a diagnostic module can instruct APIs to marshal in advance some pre-specified amount of state data for performance of a diagnostic operation. The pre-specified amount of state data can be marshaled in parallel with virtual machine 102S initiating a shadow process that is to reconstitute the state data. The pre-specified amount of state data can be estimated to be the amount of state the shadow process is to use to perform the diagnostic operation. Alternately, the pre-specified amount can be all of the state data for a target execution context. For example, debugger 101 can instruct debugging APIs 107 to marshal some pre-specified amount of state data from memory 113 and/or registers 114 for performing a debugging operation at shadow process 121.

In further embodiments, marshaling a pre-specified amount of state data and marshaling state data as-needed are used in combination. Using a combination of both as-needed and in advance marshaling provides a flexible mechanism for adjusting performance characteristics. For example, upon receiving diagnostic input, a pre-specified amount of state data can be marshaled in advance. The pre-specified state data can be delivered to and reconstituted at a shadow process. Subsequently, a diagnostic module can detect code attributes and/or annotations in the shadow process. The diagnostic module can determine, based on the detected code attributes/ and or annotations, that further state data is needed to appropriately perform the diagnostic operation in the shadow process. Accordingly, the diagnostic module can instruct APIs to marshal the remaining state data needed to appropriate perform the diagnostic operation.

Likewise, embodiments of the invention can instrument assemblies using a variety of different mechanisms. In some embodiments, assemblies are completely instrumented prior to creation of a shadow process. For example, sometime subsequent to the creation of assembly 132 but prior to debugging target process 111, instrumentation module 104 can instrument assembly 132 in its entirety to create instrumented assembly 132I.

In other embodiments, assemblies are partially instrumented prior to creation of a shadow process. For example, sometime subsequent to the creation of assembly 132 but prior to debugging target process 111, instrumentation module 104 can instrument portions of assembly 132 to create instrumented assembly 132I.

In further embodiments, virtual machine 102S interoperates with instrumentation module 104 to instrument portions of an assembly on an as-needed basis based on the desired diagnostic operation. For example, virtual machine 102S can interoperate with instrumentation module 104 to instrument portions of assembly 132 on an as-needed basis to perform a function evaluation.

In further embodiments, partial instrumentation prior to creating a shadow process is combined with as-needed instrumentation.

Figure 2:
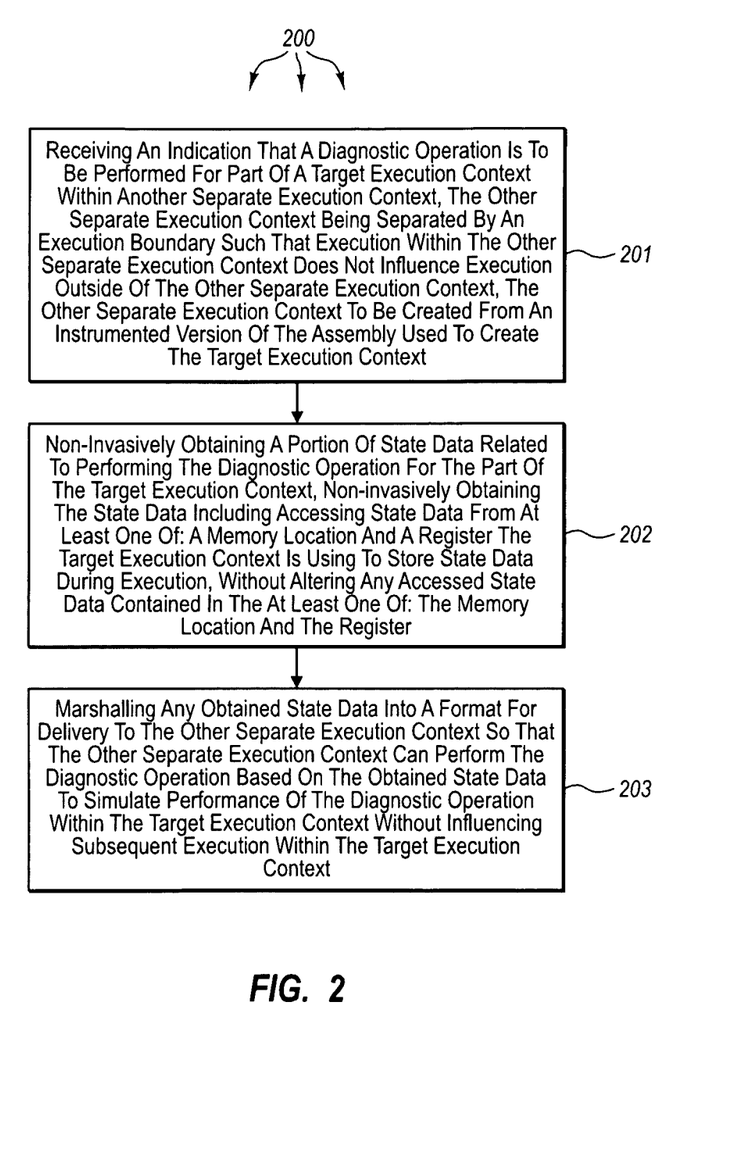
FIG. 2 illustrates a flow chart of an example method for marshaling data to perform a diagnostic operation for a target execution context.

FIG. 2 illustrates a flow chart of an example method 200 for marshaling data to perform a diagnostic operation for a target execution context. The method 200 will be described with respect to the components and data depicted in computer architecture 100.

Method 200 includes an act of receiving an indication that a diagnostic operation is to be performed for part of a target execution context within another separate execution context, the other separate execution context being separated by an execution boundary such that execution within the other separate execution context does not influence execution outside of the other separate execution context, the other separate execution context to be created from an instrumented version of the assembly used to create the target execution context (act 201). For example, debugger 101 can receive user input 141 indicating that function evaluation is to be performed for function 112. In response, debugger 101 can instruct virtual machine 102S to create shadow process 121 from instrumented assembly 132I (an instrumented version of assembly 132). As previously described, shadow process 121 can be separated from target process 111 by a process boundary such that execution within shadow process 121 does not influence execution of other processes outside of shadow process 121.

Method 200 includes an act of non-invasively obtaining a portion of state data related to performing the diagnostic operation for the part of the target execution context, non-invasively obtaining the state data including accessing state data from at least one of: a memory location and a register the target execution context is using to store state data during execution, without altering any accessed state data contained in the at least one of: the memory location and the register (act 202). For example, debugger 101 can non-invasively obtain state data 116 related to performing the function evaluation of function 112. Debugger 101 can instruct debugging APIs 107 to non-invasively obtain state data 116 from memory 113 and/or registers 114. Debugging APIs 107 can obtain state data 116 without executing code in target process 111. As such, there is little, if any, chance of debugging APIs 107 altering state data 116 as contained in memory 113 and/or registers 114.

Method 200 includes an act of marshaling any obtained state data into a format for delivery to the other separate execution context so that the other separate execution context can perform the diagnostic operation based on the obtained state data to simulate performance of the diagnostic operation within the target execution context without influencing subsequent execution within the target execution context (act 203). For example, debugger 101 can marshal state data 116 into a format (that retains the managed state of target process 111) for delivery to shadow process 121 so that shadow process 121 can perform the function evaluation of function 112 based on state data 116. Accordingly, shadow process can simulate the function evaluation of function 112 without influencing execution within target process 111.

State data 116 can obtained and marshaled in advance, as-needed, or using some combination thereof based on the configuration of debugger 101 and instrumentation of instrumented assembly 132I.

Figure 3:
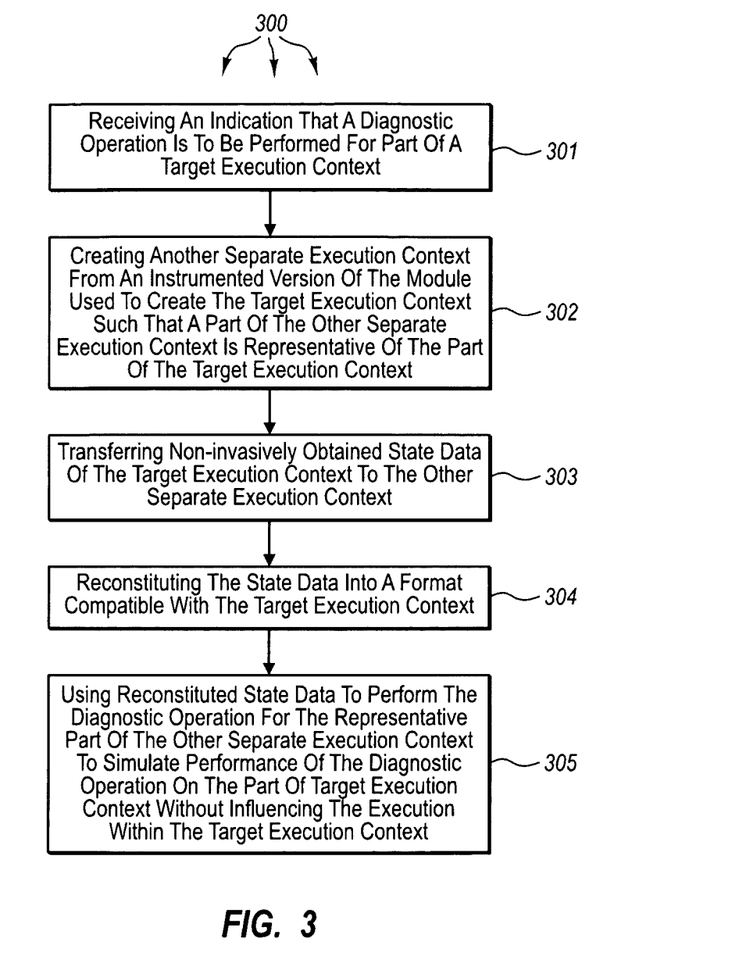
FIG. 3 illustrates a flow chart of an example method for performing a diagnostic operation for a target execution context.

FIG. 3 illustrates a flow chart of an example method 300 for performing a diagnostic operation for a target execution context. The method 300 will be described with respect to the components and data depicted in computer architecture 100.

Method 300 includes an act of receiving an indication that a diagnostic operation is to be performed for part of a target execution context (act 301). For example, debugger 101 can receive user input 141 indicating that function evaluation is to be performed for function 112 of target process 111.

Method 300 includes an act of creating another separate execution context from an instrumented version of the module used to create the target execution process such that a part of the other separate execution context is representative of the part of the target process (act 302). For example, debugger 101 can instruct virtual machine 102S to create a shadow process for evaluating function 112 of target process 111. In response, virtual machine 102S can create shadow process 121 from instrumented assembly 132I. Since instrumented assembly 132I is an instrumented version of assembly 132 (the assembly used in creating target process 111), shadow process 121 also includes function 112.

Method 300 includes an act of transferring non-invasively obtained state data of the target execution context to the other separate execution context (act 303). For example, debugger 101 can transfer state data 116 (obtained from memory 113 and/or registers 114) to shadow process 114. Method 300 includes an act of reconstituting the state data into a format compatible with the target execution context (act 304). For example, shadow process 121 can reconstitute state data 116 into memory 123 and/or registers 124. Accordingly, the state of target process 111 with respect to function 112 is appropriately represented in memory 123 and/or registers 124.

State data 116 can be transferred to shadow process 121 in advance, as-needed, or using some combination thereof based on the configuration of debugger 101 and instrumentation of instrumented assembly 132I. Additionally, instrumentation of instrumented assembly 132I can be inserted into instrumented assembly 132I in advance of debugger 101 receiving user input 141, as-needed to indicate appropriate state data for evaluating function 112, or using some combination thereof.

Method 300 includes an act of using reconstituted state data to perform the diagnostic operation for the representative part of the other separate execution context to simulate performance of the diagnostic operation on the part of target execution context without influencing the execution within the target execution context (act 305). For example, debugger 101 can send function evaluation 142 to shadow process 121. In response to function evaluation 142, shadow process 121 can use state data 116 to evaluate function 112. Thus, shadow process 121 simulates evaluation of function 112 in target process 111 (since it includes essentially the same arrangement of op codes as target process 111) without influencing execution within target process 111. Shadow process 121 can return results 143 to debugger 101 to indicate the results of evaluating function 112.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, a method for marshalling data to perform a diagnostic operation for a target execution context, the method comprising:

an act of receiving an indication that a diagnostic operation is to be performed for part of a target execution context within another separate execution context, the other separate execution context being separated by an execution boundary such that execution within the other separate execution context does not influence execution outside of the other separate execution context, the other separate execution context to be created from an instrumented version of the assembly used to create the target execution context, and the other separate execution context being representative of the target execution context;

an act of non-invasively obtaining a portion of state data related to performing the diagnostic operation for the part of the target execution context, non-invasively obtaining the state data including accessing state data from at least one of: a memory location and a register the target execution context is using to store state data during execution, without altering any accessed state data contained in the at least one of: the memory location and the register;

an act of marshalling any obtained state data into a format for delivery to the other separate execution context so that the other separate execution context can perform the diagnostic operation based on the obtained state data; and simulating, in the other separate execution context, performance of the diagnostic operation within the target execution context without influencing subsequent execution within the target execution context.

2. The method as recited in claim 1, wherein the act of receiving an indication that a diagnostic operation is to be performed for part of a target execution context within another separate execution context comprises an act of receiving an indication that a debugging operation is to be performed for part of a target process.

3. The method as recited in claim 2, wherein the act of receiving an indication that a debugging operation is to be performed for part of a target process comprises an act of receiving an indication that a function evaluation is to be performed on a function in the target process.

4. The method as recited in claim 1, wherein the act of receiving an indication that a diagnostic operation is to be performed for part of a target execution context within another separate execution context comprises an act of receiving an indication that a diagnostic operation is to be performed for part of a target execution context, wherein the diagnostic operation is selected from among: a testing operation, a profiling operation, a benchmarking operation, a checkpointing operation, a roll back operation, and a comparison operation.

5. The method as recited in claim 1, wherein the act of non-invasively obtaining a portion of state data related to performing the diagnostic operation for the part of the target execution context comprises an act of obtaining state data using diagnostic APIs that do not execute code in the target execution context.

6. The method as recited in claim 1, wherein the act of non-invasively obtaining a portion of state data related to performing the diagnostic operation for the part of the target execution context comprises an act of obtaining state data for evaluating a function of a target process in a shadow process.

7. The method as recited in claim 1, wherein the act marshalling any obtained state data into a format for delivery to the other separate execution context comprises an act of marshalling any obtained state in a manner that preserved the managed state of the target execution context.

8. The method as recited in claim 1, wherein the act marshalling any obtained state data into a format for delivery to the other separate execution context comprises an act of marshalling pre-specified amount of state data in response to receiving the indication that a diagnostic operation is to be performed.

9. The method as recited in claim 1, wherein the act marshalling any obtained state data into a format for delivery to the other separate execution context comprises an act of marshalling state data in response to detecting new opcodes in the other separate execution context, the detected new opcodes indicating that further state data is needed to perform the diagnostic operation within the other separate execution context.

10. At a computer system, a method for performing a diagnostic operation for a target execution context, the method comprising:
an act of receiving an indication that a diagnostic operation is to be performed for part of a target execution context;
an act of creating another separate execution context from an instrumented version of the module used to create the target execution process such that a part of the other separate execution context is representative of the part of the target execution context;
an act of transferring non-invasively obtained state data of the target execution context to the other separate execution context;
an act of reconstituting the state data into a format compatible with the target execution context;
an act of using reconstituted state data to perform the diagnostic operation for the representative part of the other separate execution context; and
simulating, in the other separate execution context, performance of the diagnostic operation within the target execution context without influencing the execution within the target execution context.

11. The method as recited in claim 10, wherein the act of receiving an indication that a diagnostic operation is to be performed for part of a target execution context comprises an act of receiving an indication that a debugging operation is to be performed for the target execution context.

12. The method as recited in claim 11, wherein the act of receiving an indication that a debugging operation is to be performed for the target execution context comprises an act of receiving an indication that a function evaluation is to be performed on a function in the target process.

13. The method as recited in claim 10, wherein the act of receiving an indication that a diagnostic operation is to be performed for part of a target execution context comprises an act of receiving an indication that a diagnostic operation is to be performed for part of a target execution context, wherein the diagnostic operation is selected from among: a testing operation, a profiling operation, a benchmarking operation, a checkpointing operation, a roll back operation, and a comparison operation.

14. The method as recited in claim 10, wherein the act of creating another separate execution context from an instrumented version of the module used to create the target execution context comprises an act of using a virtual machine that was used to create the target execution context to also create the other separate execution context.

15. The method as recited in claim 10, wherein the act of using a virtual machine that was used to create the target execution context to also create the other separate execution context comprises an act of using a virtual machine selected from among a common language runtime and a java virtual machine to create the other separate execution context.

16. The method as recited in claim 10, wherein an act of transferring non-invasively obtained state data of the target execution context to the other separate execution context comprises an act of transferring a pre-specified amount of state data to the other separate execution context in response to receiving an indication that a diagnostic operation is to be performed for part of a target execution context.

17. The method as recited in claim 10, wherein an act of transferring non-invasively obtained state data of the target execution context to the other separate execution context comprises an act of transferring non-invasively obtained state data of the target execution context to the other separate execution context in response to at least one of code attributes and annotations in the instrumented version of the assembly indicating that the state data is needed to perform the diagnostic operation.

18. The method as recited in claim 10, wherein the act of reconstituting the state data into a format compatible with the target execution context comprises an act of storing the state data in at least one of: a memory location and a register the other separate execution context is using to store state data during execution.

19. The method as recited in claim 10, wherein the act of using reconstituted state data to perform the diagnostic operation for the representative part of the other separate execution context comprises an act of the other separate execution context using the reconstituted state data to evaluate a function from the target execution context without influencing the behavior of the target execution context.

20. At a computer system a method for performing an out-of-process evaluation of a target process function, the method comprising:
an act of receiving an indication that a function within a target process is to be evaluated to debug the target process;
an act of creating a shadow process from an instrumented version of the assembly used to create target process using the same virtual machine that manages the target process, the shadow process including the function that is to be evaluated to debug the target process, the shadow process being separated from the target process by an execution boundary such that execution within the shadow process does not influence execution within the target process;
an act of non-invasively obtaining at least a portion of the state data related to function, non-invasively obtaining at least a portion of the state data including accessing state data from at least one of: a memory location and one and register the target process is using to store state data during execution, the state data obtained without altering the state data in the at least one of: a memory location and a register;

an act of marshalling any obtained state data into an on the wire format for delivery to the shadow process;

an act of delivering the marshalled state data to the shadow process;

an act of reconstituting the marshalled state data at the shadow process into a format compatible with the target process; and an act of evaluating the function within the shadow process to debug the target process, wherein evaluation within the shadow process comprises using the reconstituted state data and simulating the behavior the function as if the function were evaluated in the target process but without influencing execution within the target process.

\* \* \* \* \*